US009272552B2

(12) United States Patent
Priyadarshi

(10) Patent No.: US 9,272,552 B2
(45) Date of Patent: Mar. 1, 2016

(54) ARBITRARY SURFACE PRINTING DEVICE FOR UNTETHERED MULTI-PASS PRINTING

(71) Applicant: Rohit Priyadarshi, Fremont, CA (US)

(72) Inventor: Rohit Priyadarshi, Fremont, CA (US)

( * ) Notice: Subject to any disclaimer, the term of this patent is extended or adjusted under 35 U.S.C. 154(b) by 0 days.

(21) Appl. No.: 14/584,941

(22) Filed: Dec. 29, 2014

(65) Prior Publication Data

US 2015/0186757 A1 Jul. 2, 2015

Related U.S. Application Data

(60) Provisional application No. 61/921,408, filed on Dec. 28, 2013.

(51) Int. Cl.
*G06F 15/00* (2006.01)
*B41J 29/00* (2006.01)
*G06F 15/02* (2006.01)

(52) U.S. Cl.
CPC ........................................ *B41J 29/00* (2013.01)

(58) Field of Classification Search
CPC ...... G06F 3/12; G06K 15/024; G06K 15/102; G06K 15/105; G06K 15/16; G06K 15/1845; B41J 11/008; B41J 3/4075; B41J 3/4078
USPC ........... 358/1.1, 1.4, 1.5, 1.8, 1.13, 1.15, 502, 358/503, 472, 473, 496
See application file for complete search history.

(56) References Cited

U.S. PATENT DOCUMENTS

| | | | | | |
|---|---|---|---|---|---|
| 5,335,594 | A * | 8/1994 | Karlyn et al. | ................... | 101/35 |
| 5,861,877 | A * | 1/1999 | Kagayama et al. | ........... | 345/179 |
| 6,357,939 | B1 * | 3/2002 | Baron | ............................ | 400/88 |
| 8,730,518 | B2 * | 5/2014 | Williams | ....................... | 358/1.8 |
| 2003/0043388 | A1 * | 3/2003 | Andrews et al. | ............... | 358/1.7 |
| 2004/0233242 | A1 * | 11/2004 | Patton et al. | .................... | 347/14 |
| 2008/0144053 | A1 * | 6/2008 | Gudan et al. | ................... | 358/1.8 |
| 2008/0204489 | A1 | 8/2008 | McKinley et al. | | |
| 2009/0011066 | A1 | 1/2009 | Davidson et al. | | |
| 2010/0157008 | A1 | 6/2010 | Silverbrook | | |
| 2014/0285600 | A1 * | 9/2014 | Domeier et al. | ............. | 347/102 |

* cited by examiner

*Primary Examiner* — Gabriel Garcia
(74) *Attorney, Agent, or Firm* — Lincoln Law School of San Jose

(57) ABSTRACT

An untethered, arbitrary-surface printing device includes a housing, a print head, positioning means, locomotive means, and sensors configured to perform multi-pass high-precision printing (i.e. at least 300 dots per inch) on nearly any surface texture.

12 Claims, 10 Drawing Sheets

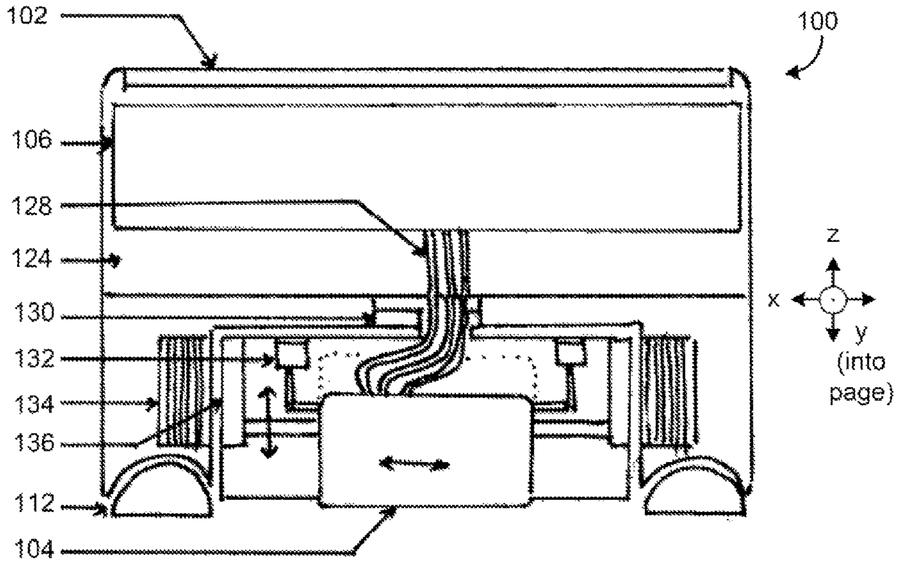

FIG. 26

2700

Perform one or more multi-pass printing operations on an arbitrary surface using an untethered printing device to create markings on the arbitrary surface. The multi-pass printing operations include: 2702

Moving the untethered printing device along the arbitrary surface; and 2704

Creating the markings by either engaging the arbitrary surface with a stylus or depositing a printing material on the arbitrary surface. 2706

FIG. 27

ARBITRARY SURFACE PRINTING DEVICE FOR UNTETHERED MULTI-PASS PRINTING

RELATED APPLICATIONS

This application is related to, and claims the benefit of priority from, U.S. Provisional Patent Application No. 61/921,408 to Rohit Priyadarshi, entitled "Untethered Arbitrary Surface Printing Device" and filed Dec. 27, 2013. All subject matter disclosed in the aforementioned provisional parent application is herein incorporated by reference.

FIELD OF INVENTION

The present invention relates to printing, and more particularly, this invention relates to using an untethered device, i.e. a free-moving device, to accomplish printing on variable surfaces and textures.

As well-known in the art, an electric printer generally comprises a housing, a print head, a cartridge or reservoir for storing and dispensing printing material, e.g., ink, a tray for storing paper, means for moving the paper throughout the housing (e.g. a plurality of rollers) and means for moving, the print head in at least one dimension during a printing operation (e.g. a servo motor assembly). These generic electric printers are exemplified by so-called "desk jet" "inkjet" "laser" and "dot-matrix" configurations. Other examples of electric printers include label makers, cash-register receipt printers, etc. Typically, electric printers move the printing surface (e.g. the paper) throughout the housing and traverse the print head thereacross to precisely dispense printing material according to a predefined pattern.

By contrast, mechanical printers may instead be designed to print using mechanical force, and generally include a housing, a print head (e.g. a rubber stamp, roller, etc.), and may optionally include either or both of: mechanical means for moving or positioning the print head (e.g. a shutter and tracks such as included in common address stamps, an axle for a roller, etc.) and a cartridge or reservoir for storing and dispensing printing material. Typically, the mechanical printer relies on a user to align the print head with the desired print surface, and apply physical force to the printer to accomplish the print operation. U.S. Pat. No. 7,682,093 to Kia Silverbrook details an exemplary mechanical printing device of the "retractable shutter" variety.

Recently, some printers have diverged from these conventional "electric" and "mechanical" conventions, representing a revolution in the printing industry known as three-dimensional (3D) printing. 3D printers are designed for fabrication rather than traditional "printing" (i.e. creating markings on a surface) and therefore have a divergent configuration and components from the typical printer configurations discussed above. As the present inventive concepts are directed to devices configured for creating markings on a surface rather than devices configured for fabrication, a detailed discussion thereof is omitted for brevity. For an exemplary discussion of 3D printer configurations adapted from conventional electrical printer configurations, see U.S. Pat. No. 7,435,368 to Davidson, et al. Of course, other 3D printer configurations may be utilized, but are not pertinent to the present disclosures.

However, all of the foregoing printer configurations are subject to common limitations: immobility and inflexibility with respect to print surface. Conventional electrical printers are bulky, heavy devices that must remain in a fixed location and orientation to ensure proper operation. Electrical printers are renowned for experiencing "jams" due to slight deformities in paper being moved throughout the housing, or even simply due to slight irregularities in operation even when working with a "perfect" sheet of paper.

Mechanical printers are not necessarily subject to the jamming problems common to electrical printers, but may experience similar issues e.g. problems with the motion of the print head/shutter mechanism on an address label) in some cases. However, mechanical printers are also subject to mobility limitations, relying entirely on the user to position and perform the printing operation manually. Conventional mechanical printers are not capable of printing predefined patterns with precision and complexity characteristic of electrical printers, instead relying on the skill of the user to accomplish any detailed or custom-tailored printing.

3D printers are capable of even more complex patterns than conventional electrical printers, and do not suffer from the same "jamming" problems (although 3D printers may have a similar variety of challenges arising from problems with the extrusion or deposition process or print surface sensitivity. However, 3D printers are even more sensitive, to location and orientation, and often orders of magnitude larger and heavier than conventional electrical printers, making these configurations even less capable of mobility and mobile printing.

While some self-propelled printers have been disclosed, e.g. Chinese Patent Publication Nos. CN 100588552 (filed Jan. 21, 2007) and CN 10154432 (filed Mar. 27, 2008), these configurations focus on printing on non-flexible material and a print area larger than the footprint of the printer device itself, rather than precise multi-pass printing rivaling that of conventional electrical printers as featured in the presently disclosed inventive embodiments.

Existing untethered printers such as disclosed in the above references are not capable of performing high-precision or multi-pass printing, especially using different colors and/or printing materials due to lack of synchronization and alignment between different passes. Further, it is typically impossible to remove the arbitrary print surface where printing is desired and insert it in a conventional printer.

Accordingly, the present inventive concepts solve the foregoing problems by disclosing devices configured to print, i.e. to create markings, on surfaces having variable textures, topography, and/or geometry. The inventive devices also feature locomotive means and a plurality of sensors configured to provide positional awareness and monitor progress of a print operation to enable the device to autonomously print on nearly any surface according, to complex patterns.

BRIEF SUMMARY

In one embodiment, an untethered, arbitrary-surface printing device includes: a housing; locomotive means coupled to the housing and configured to move the device along the arbitrary surface; a carriage disposed within the housing and coupled to a print head configured to create markings on the arbitrary surface; a plurality of sensors, each sensor hang configured to provide one or mote of positional data, image data, and movement, data; and at least one controller configured to cause the device to: monitor one or more of a position and an orientation of at least one of the device, the print head, and one or more of the sensors; modify one or more of a position and an orientation of the print head using the carriage; modify one or more of a position and an orientation of the device with respect to the arbitrary surface using the locomotive means; modify one or more of a position and at orientation of one or more of the sensors; and create the markings on the arbitrary surface using the print head.

In another embodiment, a method includes performing one or more multi-pass printing operations on an arbitrary surface using, an untethered printing device to create markings on the arbitrary surface. The multi-pass printing operation(s) comprise(s): moving the untethered printing device along the arbitrary surface; and creating the markings by either: engaging the arbitrary surface with a stylus; or depositing a printing material on the arbitrary surface. Notably, the markings are characterized by a resolution of at least 300 dots per inch (DPI).

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 26 depicts a cross-sectional side view of an untethered, arbitrary surface printing device, according to one embodiment.

FIG. 27 is a flowchart of a method, according to one embodiment.

DETAILED DESCRIPTION

Figure 1:
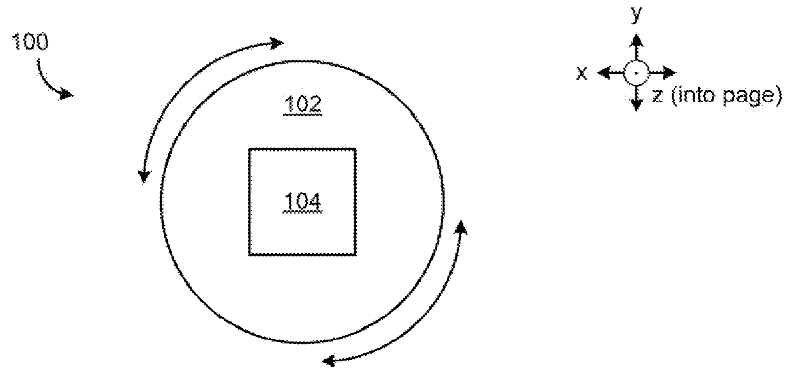
FIG. 1 depicts orientation tracking from a bottom view of an untethered, arbitrary surface printing device, according to one embodiment.

The following description is made for the purpose of illustrating the general principles of the present invention and is not meant to limit the inventive concepts claimed herein. Further, particular features described herein can be used in combination with other described features iii each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an" and "the" include plural referents unless otherwise specified.

The following description discloses several preferred embodiments of magnetic storage systems, as well as operation and/or component parts thereof.

In one general embodiment an untethered, arbitrary-surface printing device includes: a housing; locomotive means coupled to the housing and configured to move the device along the arbitrary surface; a carriage disposed within the housing and coupled to a print head configured to create markings on the arbitrary surface; a plurality of sensors, each sensor being configured to provide one or more of positional data, image data, and movement data: and at least one controller configured to cause the device to: monitor one or more of a position and an orientation of at least one of the device, the print head, and one or more of the sensors; modify one or more of a position and an orientation of the print head using the carriage; modify one or more of a position and an orientation of the device with respect to the arbitrary surface using the locomotive means; modify one or more of a position and an orientation of one or more of the sensors; and create the markings on the arbitrary surface using the print head.

In another general embodiment, a method includes performing one or more multi-pass printing operations on an arbitrary surface using an untethered printing device to create markings on the arbitrary surface. The multi-pass printing operation(s) comprise(s): moving the untethered printing device along the arbitrary surface; and creating the markings by either: engaging the arbitrary surface with a stylus; or depositing; a printing material on the arbitrary surface. Notably, the markings are characterized by a resolution of at least 300 dots per inch (DPI).

As will be appreciated by one skilled in the art, aspects of the present invention may be embodied as a system, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized, e.g. a portable computer diskette, a hard disk, a random access memory (RAM), a read-only memory (ROM), an erasable programmable read-only memory (EPROM or Flash a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, of device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote control board, computer or server, in the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary utilities for the aforementioned general features may include multiple market segments, for example industrial, office, home and school. Its utility can range from professional products to toys. Sophisticated versions can be used in the industrial segment to paint signboards, print high quality images on arbitrary surfaces, automated measured markers etc. The images would be controlled and printer oriented by external controllers. Multi-pass printing can be utilized to print high quality images.

Simpler versions can be used to label any surface, the user can slide the printer on the surface to print a label, for example on product boxes reducing the use of paper. It can replace rubber stamping devices enabling user to print labels on documents in the office scenario. An external orientation controller may not be necessary, rather the printing can be aligned by use of controlled locomotion.

With the foregoing general concepts in mind, we return to the inventive disclosures regarding arbitrary-surface untethered printing devices and techniques.

As understood herein, "high-precision" printing is defined as the ability to achieve at least 300 dots per inch (DPI) print quality. Preferably, high-precision printing also exhibits an error rate not exceeding 8 microns across a print distance of 1 centimeter.

A general summary of operative features, components, and techniques considered within the scope of the inventive concepts disclosed herein is provided below, followed by a more detailed description of the structural arrangement of the inventive devices, with reference to the drawings.

In one embodiment, the printer may be swept across the printing surface. The actuators will control different kinds of marking apparatus like ink, pencil, chalk, lead, knife, laser, etc. to draw. The tracking of the print head will be performed by an onboard controller. Alignment and synchronization can be performed by synchronizers like external anchors, cameras etc.

In various approaches, the printer can work manually as it is swept across print surface by hand. The control logic can be powered by portable power packs that control the printer components. This mode is quite complicated and may have to deploy synchronizers and multiple tracking mechanism to synchronize and align the printing process with the help of complex hardware and software algorithms. Conversely, motion can also be fully automated where the printer carriage moves across the print surface by itself via robotic control. Due to the automated carriage control, the synchronization and alignment of the print head becomes simpler.

To this effect, the printer can be controlled by software on a computing device, like a smartphone or an external computer along with an onboard controller. The synchronization data can be transmitted by the synchronization anchors or camera using imaging processing to the printer's control logic to maintain angle, alignment, framing and stylus movement.

In more embodiments, all the printing styles discussed herein may deploy multiple tracking mechanisms listed below to align printer output.

First, with respect to orientation control, synchronization signals for orientation can be sent via laser, ultrasonic, infrared or RF device anchored around the print area in a manner similar to handwriting capture devices. A camera can also be used to orient the printer through image processing. An accelerometer, gyroscope and magnetometer can be used to keep track of orientation. Separate orientation devices are not needed for all embodiments.

Next, regarding angle tracking, the print head rotates 360° in an x-y plane to maintain correct angular alignment during printing as the printer carriage moves across the surface being printed upon.

With respect to frame tracking, the print head can oscillate horizontally, keeping the x/y-axis to freeze frame relative to printing surface while its main body is still moving to finish printing on a unit area. It is required for contact print heads like a dot-matrix configuration, in order to prevent the pins from dragging on the print surface by moving the print head in discrete steps to prevent smudges. This also allows for improvement of relative speed control for other printer types. This is similar in nature to cinematic film pause at each frame so that human eye gets a chance to see the frame.

Now regarding surface tracking, the print head can move vertically, along the z-axis, with respect to the surface to maintain a threshold distance from the surface, e.g. a distance of about 1 mm in preferred embodiments.

In some approaches, rather than a print cartridge, the presently disclosed inventive devices may utilize a stylus based print head, which can attach pen, chalk or pencil that can be replaced by different colors manually. The stylus may be moved up and down along the z-axis to make contact with the printing surface, as discussed above regarding the threshold distance from the surface. In addition, in embodiments where a stylus holder is employed, the stylus may be rotated around a longitudinal axis thereof (like a drill) to draw dots leaving, clear impression on the print surface.

More exemplary features of the presently disclosed inventive devices include ink, control, position sensing, error control, scribing and scanning. In brief, ink flow is controlled by an ink controller based on industry standards.

Position sensing may utilize a position sensor, which may include any combination of onboard optical, gyroscope, accelerometer and magnetic sensors. External position assist sensors may include a combination of laser, ultrasonic, infrared, and/or RF device(s) anchored around the print area. High precision position sensing of up to 1 micron may be built around laser interferometers.

Regarding error control, a variety of mechanisms are used to keep error under acceptable limits. Multiple optical sensors are used to minimize error creep into the position sensing. Cross-referencing is done using the data from gyroscope, accelerometer and magnetic sensors. External position assist sensors provide additional cross-reference to prevent error creep.

Regarding position scribing, and as known in the art, it is possible to utilize a plurality of absolute position-indicative marks within the print area to determine device position. This mode relies on onboard position sensors and positional scribes. The onboard position sensing corrects accumulated error based on error correction scribe pre-drawn on print surface. These scribes may include any conventional, known position scribe, such as exemplified by LIVESCRIBE® dot paper technology.

Alternatively and/or additionally, scribing ma rely on virtual rather than physical markings, e.g. in the form of laser scribing marks. Virtual laser scribes are in effect similar to drawn scribes. One or more laser anchors will broadcast encoded laser beams at a fixed angle across the print surface. As the printer moves across the surface, it senses the laser beams, their encoding and determines the precise location of the beams to allow correction of error creep.

Error may be corrected based on scanning and alignment with a previously printed image. The image printed is not continuous, but has a positional pattern left over at the leading edge. This pattern is filled in with the second pass and hence rendered invisible as it becomes part of the printed image. The second pass subsequently leaves a new pattern at the newly created edge to be filled in by subsequent pass. This method guarantees perfect alignment with previously printed portion of the image.

In addition, the alignment can be re-established even if the printing is stopped for any reason midway and the user removes the printer, for example to replenish the ink. If the printer is brought back again, the printer will be able to sense the edge and actual location of the completed image to continue printing the material.

Additional nozzles can be included in the print head that mark the print surface. An alignment controller keeps the print head aligned with the marks to print subsequent marks.

Turning now to the figures, FIG. 1 depicts orientation tracking from a bottom view of an untethered, ail surface printing device 100, according to one embodiment. The device 100 is shown with a housing 102 and a print head 104 disposed therein. Details of the various components and their arrangement are described in further detail herein. With specific reference to FIG. 1, orientation tracking of the device 100 is demonstrated as capability of the device 100 to rotate around a central axis (extending out of the page as shown in FIG. 1). Orientation tracking may be accomplished using any suitable components or techniques described herein. Preferably, orientation tracking utilizes a plurality of sensors (not shown) in communication with one or more onboard controllers (also not shown) and control logic.

The sensors provide orientation feedback, e.g. via a plurality of cameras arranged within the housing 102 and configured to capture image data (e.g. depicting the surface and/or any markings created thereon), via a plurality of lasers arranged around an exterior of the housing 102, via radio frequency (RF) transmitters and/or receivers arranged in and/or on the housing 102 and/or in the vicinity of the printing surface (e.g. arranged around a periphery of the print area, within a remote controller or mobile device configured to control the arbitrary surface printer 100, etc. as would be understood by one having ordinary skill in the art), or via any other suitable mechanism and/or technique as disclosed herein. Of course, combinations and/or permutations of the foregoing exemplary sensor arrangements may be employed to facilitate orientation tracking, and any equivalents thereof that would be appreciated by a skilled artisan upon reading the instant disclosures, without departing from the scope of the present inventive concepts.

Figure 2:
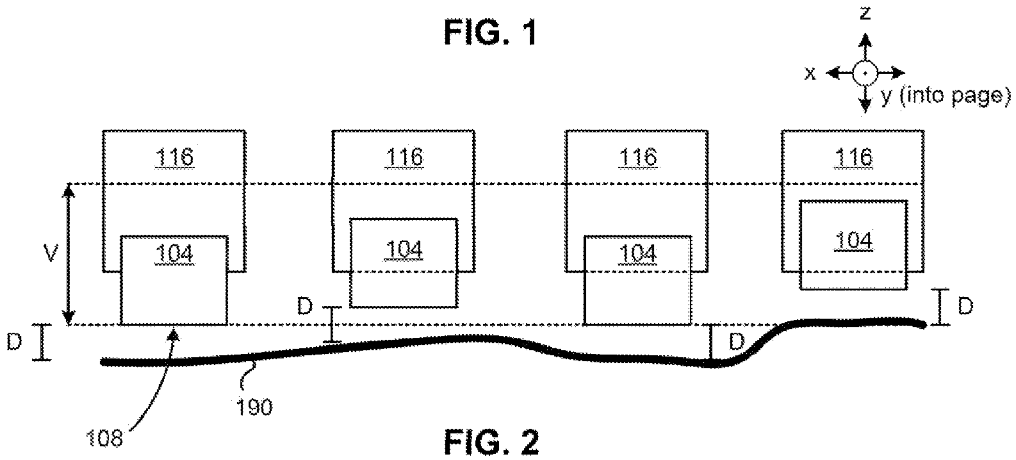
FIG. 2 illustrates a side-view of a print head assembly traversing across a variable-textured surface to maintain a predetermined proximity between the print head a id the surface, according to one embodiment.

FIG. 2 illustrates surface tracking via a side-view of a print head assembly 104, according to one embodiment. The side view depicts the print head 104 moving vertically with respect to the variable print surface 190 as the device 100 moves along the variable surface and the height of the print head 104 is adjusted so as to maintain a desired distance D between the print head 104 and the variable print surface 190. Preferably, the surface tracking is accomplished via a plurality of sensors disposed within the housing 102 and/or on the print head 104. The height of the print head 104 may be adjusted using any suitable mechanisms and/or techniques disclosed herein, such as a servo motor assembly (not shown, and also including those that would be appreciated by a skilled artisan upon reading the present descriptions.

Figure 3:
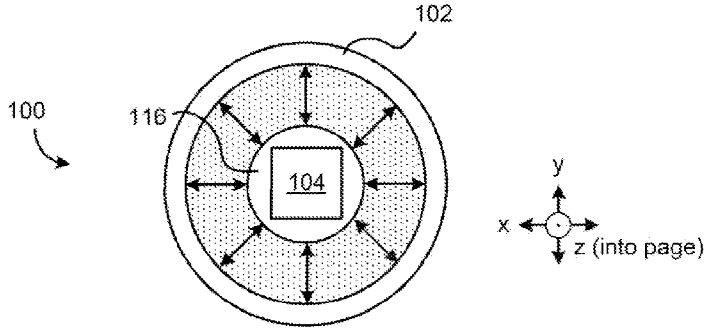
FIG. 3 depicts frame tracking from a bottom-view of an untethered, arbitrary surface printing device, according to one embodiment.

FIG. 3 depicts frame tracking from a bottom-view of an untethered, arbitrary surface printing device 100, according to one embodiment. As shown, frame tracking generally permits the print head 104 to traverse a space within the housing 102 in an x-y plane. Notably, the frame tracking motion of the print head 104 occurs independently of any motion of the device 100 as achieved via the locomotive means (not shown) also included in the exemplary embodiment shown in FIG. 3.

Figure 4:
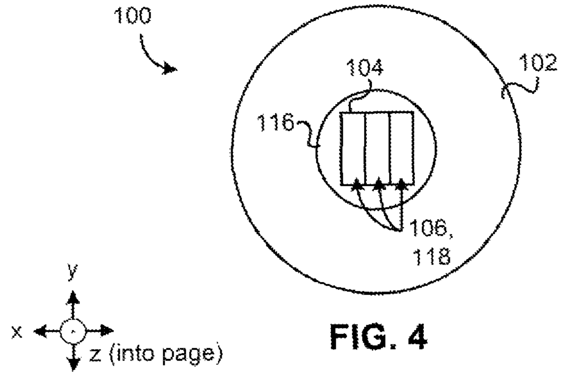
FIGS. 4-7 depict several embodiments of print head configurations suitable for use in the presently disclosed printing devices.

FIGS. 4-7 depict several embodiments of print head configurations suitable for use in the presently disclosed printing devices. As shown in FIG. 4, a print head 104 may include a conventional ink-dispensing head such as an inkjet printer head, which may include black/white and/or color ink printing capabilities and/or ink reservoir(s) 106, such as red/green/blue (RGB) and/or cyan/magenta/yellow/black (CMYK). Of course, any suitable ink print head known in the art may be utilized without departing from the scope of the present inventive concepts.

Figure 5:
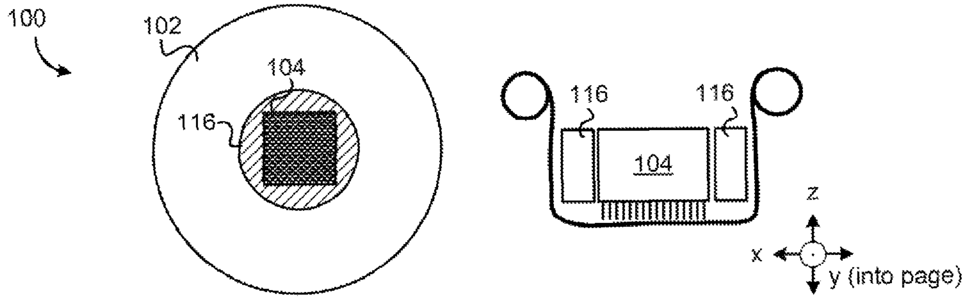

Additionally and/or alternatively, as shown in FIG. 5, the print head 104 may include a traditional dot-matrix configuration, and may use any dot matrix configuration known in the art.

Figure 6:
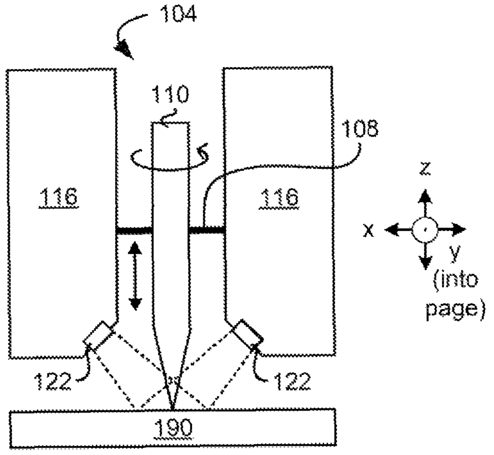
Figure 7:
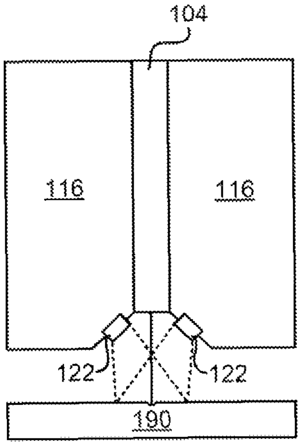

In some embodiments, and as shown in FIG. 6, the print head 104 may comprise a stylus holder 108 and removable stylus 119. The stylus holder may have all the tracking functionality discussed above in addition to a mechanism configured to rotate the stylus 110 within the holder 108 around a longitudinal axis of the stylus 110.

In various approaches, the print head 104 may additionally and/or alternatively include a traditional laser print head, including any suitable laser print head that would be understood as suitable by a skilled artisan upon reading the present disclosures.

In embodiments such as depicted in FIGS. 4-7, the print head 104 may additionally, and preferably, include a plurality of sensors 112 coupled thereto. The sensors may be arranged in any suitable manner, but preferably are oriented and positioned in a configuration that provides detailed, capability to capture image data depicting the print area 190, at least in a region proximate to the print head 104, e.g. an area encompassing the periphery of the print head 104 in an x-y plane. Optionally, the sensors 112 may be configured to also capture image data in a region within a threshold distance surrounding the periphery of the print head 104, such as within 1 mm, 5 mm, 1 cm, 2.5 cm, or 5 cm, in various embodiments.

In this manner, the printing device 100 may accomplish the aforementioned tracking functionality, among others discussed below with respect to FIGS. 10-15, at least partially based on processing image data captured by the sensors 112 and determining position and/or orientation of the printing device 100 within the print area 190 and/or the print head 104 within the printing device 100 to accomplish tracking without relying on positional sensors or movements sensors such as gyroscopes, accelerometers, global positioning systems, etc. as would be understood by one having ordinary skill in the art upon reading the present descriptions.

More specifically, the sensors may capture image data, which may be analyzed using either an on-device or remote processing, engine (not shown) configured to process the image data and determine absolute and/or relative position of the print device 100 within the print area 190 and/or the print head 104 within the printing device 100. Such processing engine is preferably configured, via computer readable program instructions, to perform image processing using the captured image data and generate instructions for the device 100 to position and/or orient itself within the print area 190 in a manner suitable to accomplish the desired print operation, most preferably multi-pass printing.

Of course, it is entirely within the scope of the instant disclosures to additionally and/or alternatively accomplish tracking by including positional and/or movement sensors such as discussed above in the plurality of sensors 112. In these embodiments, plural types of sensors may be utilized in conjunction. Regardless of the number and/or type of sensors included in the plurality of sensors 112, it will be understood that the present inventive concepts utilized facilitate high-fidelity tracking sufficient to enable high-precision e.g. at least 300 DPI), multi-pass printing across a variable texture surface.

Figure 8:
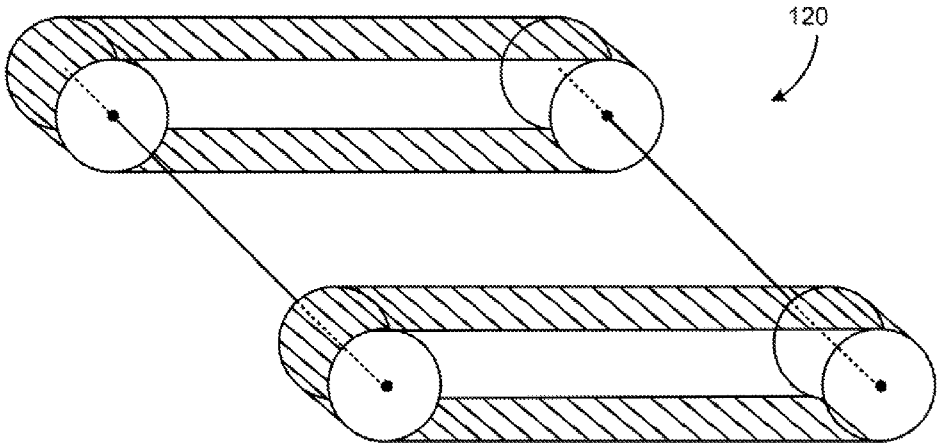
FIGS. 8-9 depict exemplary locomotive means according to several embodiments of the present descriptions.
Figure 9:
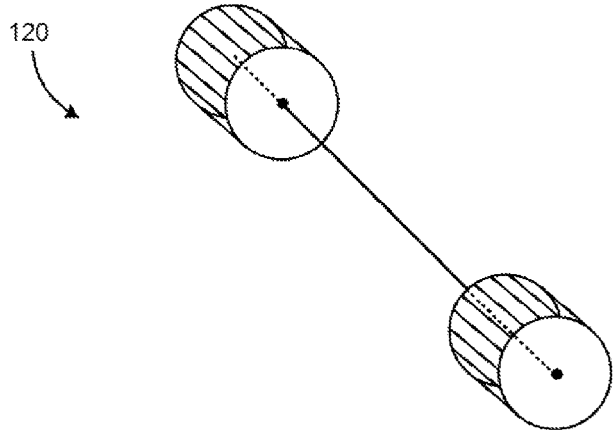

FIGS. 8-9 depict exemplary locomotive means 120 according to several embodiments of the present descriptions. As shown in FIG. 8, sonic embodiments may include conventional track-based locomotive means 120, while other embodiments may include wheel-based locomotive means 120, such as shown in FIG. 9. Of course, any suitable means of locomotion for a small device that would be appreciated by a skilled artisan upon reading the present descriptions should be understood as included within the scope of the present descriptions, without limitation.

FIGS. 10-15 depict detailed frame tracking according to various embodiments of a print head 104 within the scope of the present disclosures.

Figure 10:
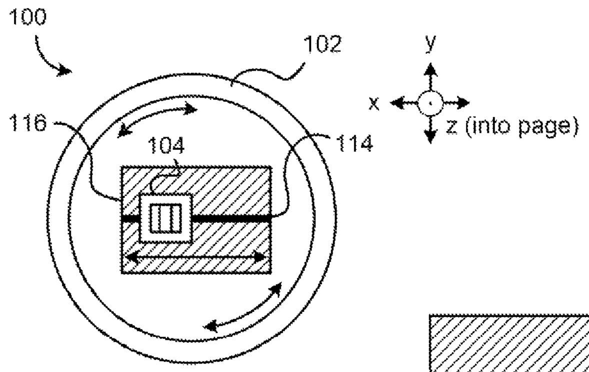
FIGS. 10-15 depict detailed frame tracking according to various embodiments of a print head assembly within the scope of the present disclosures.

As shown in FIG. 10, the print head 104 may be moved laterally within the housing 102, e.g. via a carriage 114 to which the print head 104 is coupled. The carriage 114 may take the form of any conventional printer carriage or other suitable mechanism (such as a servo motor assembly) without departing from the scope of the present descriptions. In addition, the print head 104 may be moved in a rotational fashion within the housing 102 by rotating a print head assembly 116 within which the carriage 114 and print head 104 are disposed.

Figure 11:
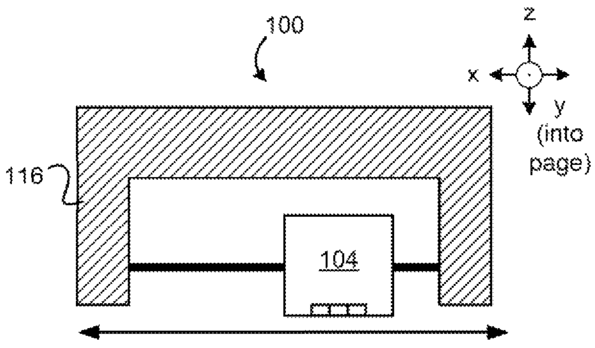
Figure 13:
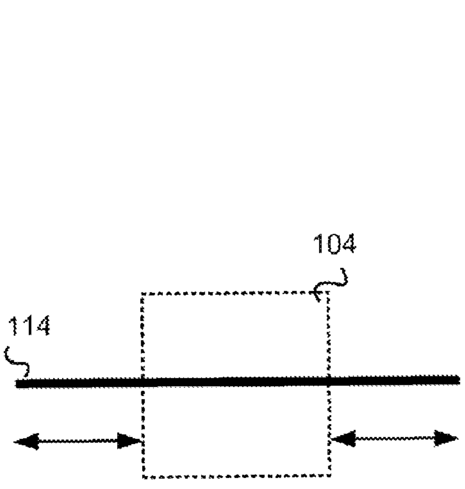
Figure 14:
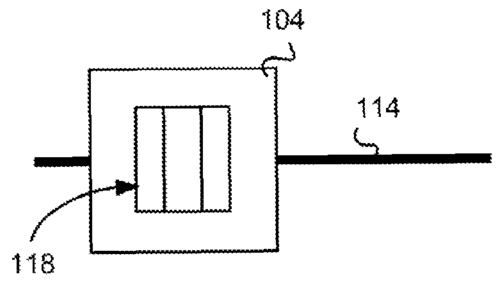
Figure 15:
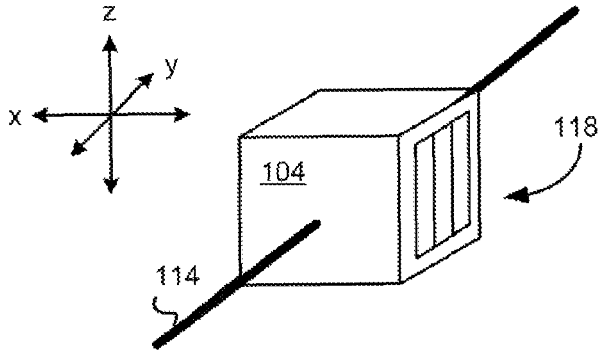

As shown in FIG. 11, the carriage 114 may comprise a servo assembly. The view depicted in FIG. 11 shows the print head 104 and carriage 114 from a side-view (print aperture facing down). FIG. 13 details the lateral movement capabilities of the print head 104 along a longitudinal axis of the carriage 114, in one approach. FIGS. 14 and 15 respectively depict a carriage 114 and print head 104 from a bottom view and a diagonal view, according to one embodiment.

Figure 12:
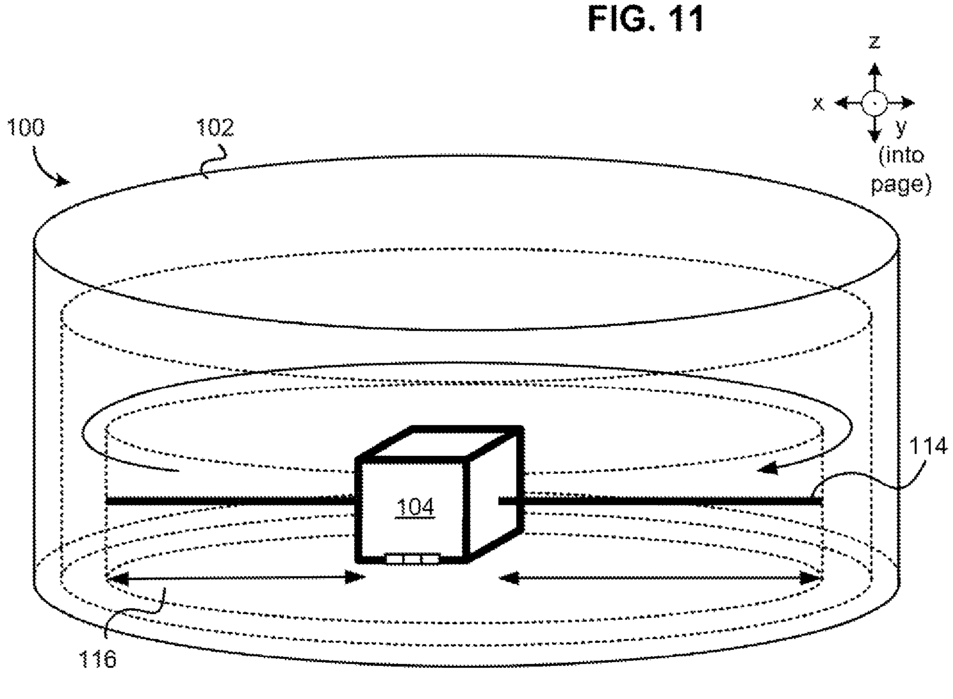

FIG. 12 depicts in greater detail the arrangement of the device 100 as a plurality of concentric cylinders. The outermost cylinder may comprise the housing 102, and the innermost cylinder may comprise the print head assembly 116, while the intermediate cylinder indicates a space within which the print head assembly 116 may traverse in an x-y plane (e.g. as shown in FIG. 3) to accomplish frame tracking. The print head assembly 116 is capable of freely rotating around a z axis (as shown in FIG. 1) to accomplish orientation tracking.

FIGS. 16-22 depict a stylus or stamp configuration according to several embodiments of the presently disclosed inventive concepts.

Figures 16, 17, 18:
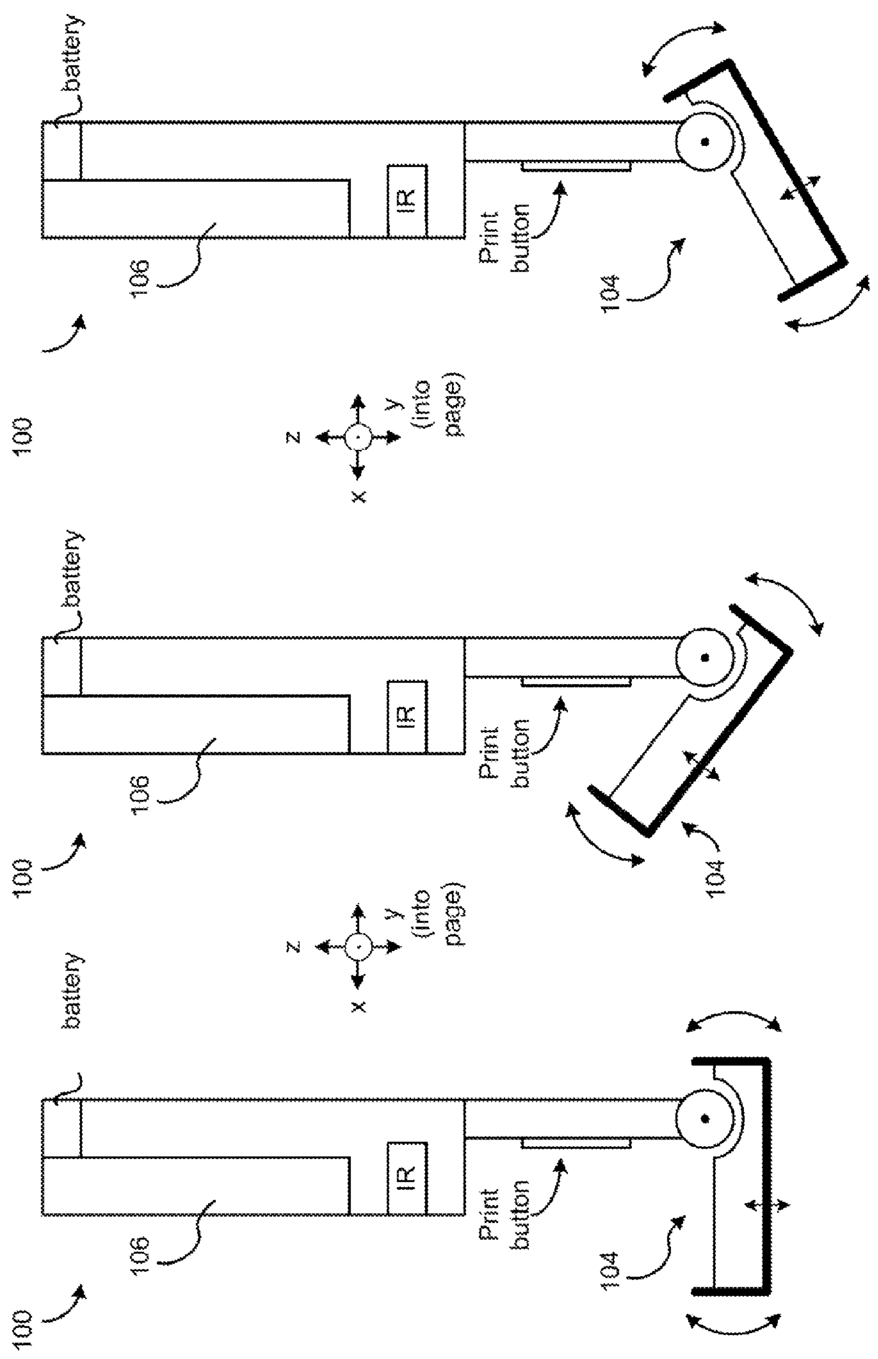
FIGS. 16-22 depict a stylus or stamp configuration according to several embodiments of the presently disclosed inventive concepts.

FIGS. 16-18 demonstrate how the print head assembly 116 articulates on a ball joint coupled to the upper portion of the device 100. The device 100 holds all the control electronics necessary to control the printer. The reservoir 106 on the left of main body is the ink cartridge. A small window labeled IR on the left allows pass through of any infrared or optical signals. The section at the upper right of the device also holds power supply or battery. There is also a print button to allow user control printing, as needed. The print head 104 includes two tracks that help the printer to move on the print surface in a straight line. The portion at the bottom of the print head 104 holds print nozzles that track the surface vertically (z-axis) to maintain 1-millimeter threshold vertical distance from the surface.

Figure 19:
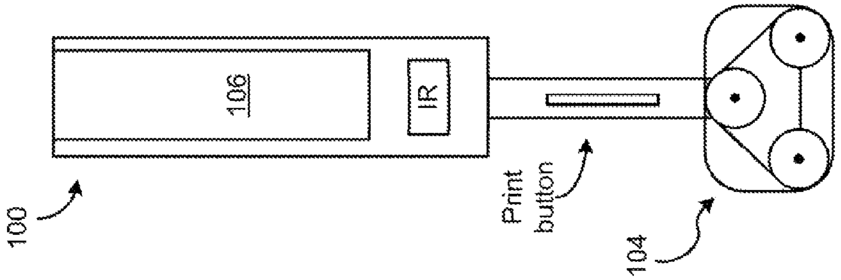
Figure 20:
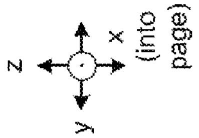
Figure 20:
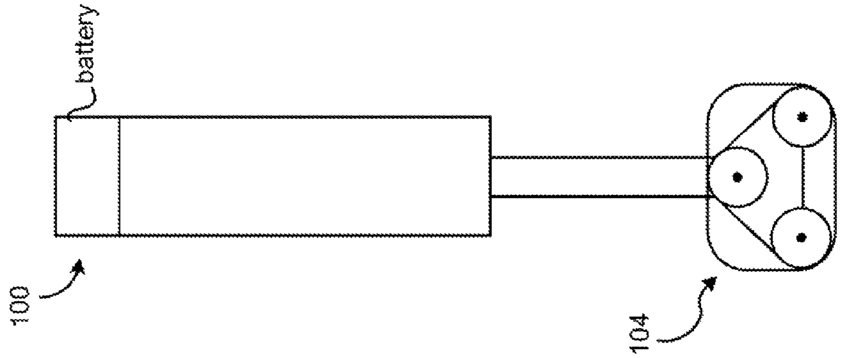

FIGS. 19-20 show the front and hack profile of the printer. The tracks on the print head are shown exposed.

Figure 22:
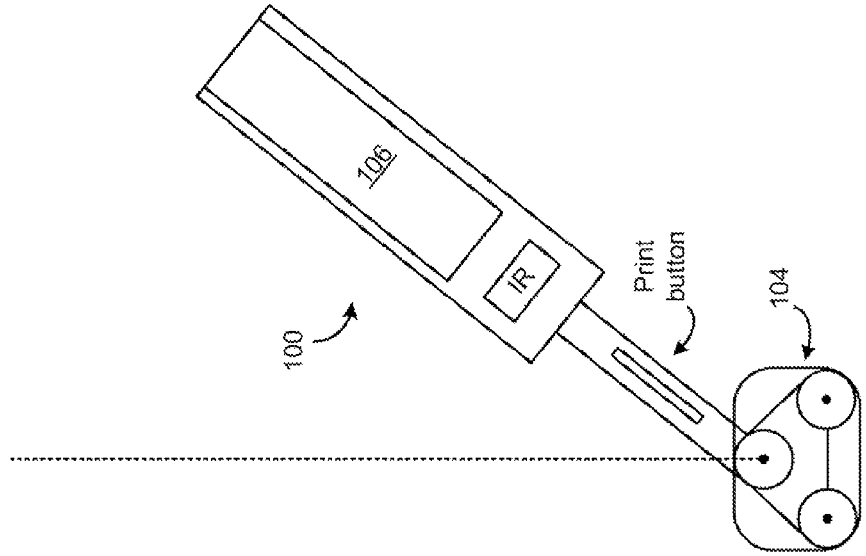
Figure 21:
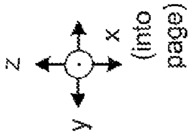
Figure 21:
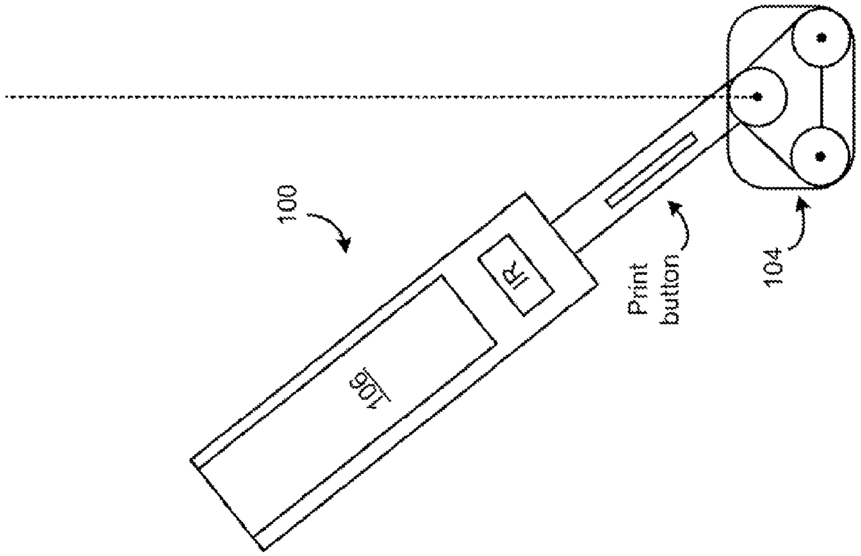

FIGS. 21-22 show further articulation of the main body and print head on the ball joint.

Figure 23:
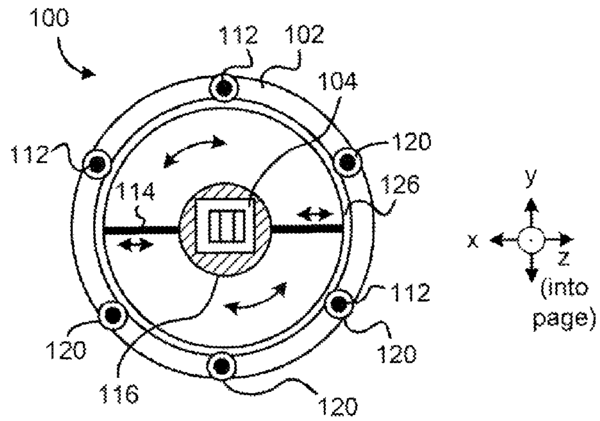
FIG. 23 depicts a bottom view of an untethered, arbitrary surface printing device, according to one embodiment.

FIG. 23 depicts a bottom view of an untethered, arbitrary surface printing device 100, according to one embodiment. As shown, the exemplary device includes a substantially circular housing 102 having six optical sensors 112 disposed on Teflon slides 120 arranged at equal intervals around a periphery thereof. The device 100 also includes a substantially circular print head assembly 116 arranged within the housing 102 and configured to freely rotate around a z-axis of the printing device 100 (into page as shown) within the housing. Thus, the circular print head assembly 104 is preferably concentric with the circular housing 102.

With continuing reference to FIG. 23, the print head assembly 116 is preferably coupled to the housing 102 via a carriage 114. The print head assembly 116 may, for example, be suspended within the interior cavity of the housing 102 by way of the carriage 114 having terminal ends disposed within a track 126 arranged around an inner circumference of the housing 102, in some embodiments.

Figure 24:
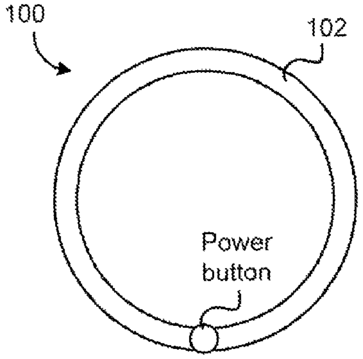
FIG. 24 depicts a top view of an untethered, arbitrary surface printing device, according to one embodiment.

FIG. 24 depicts a top view of an untethered, arbitrary surface printing device 100, according to one embodiment.

Figure 25:
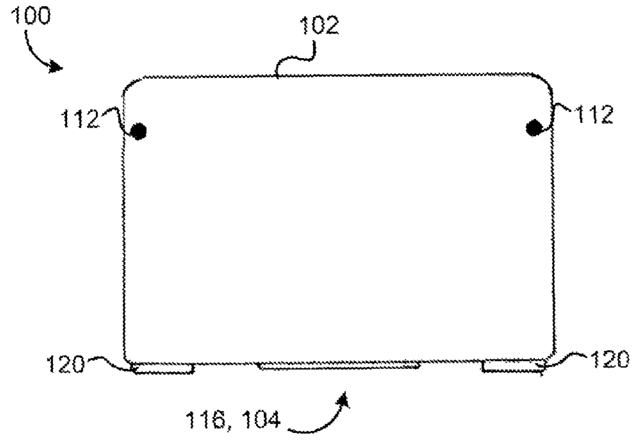
FIG. 25 depicts a side view of an untethered, arbitrary surface printing device, according to one embodiment.

FIG. 25 depicts a side view of an untethered, arbitrary surface printing device 100, according to one embodiment.

FIG. 26 depicts a cross-sectional side view of an untethered, arbitrary surface printing device 100, according to one embodiment. As shown, the device 100 includes a housing 102, ink reservoir 106, ink dispensing tubes 128, controller 124, beatings 130 to facilitate rotation of the print head assembly 116, motors 132 to facilitate vertical movement of the print head assembly 116, servo motor head poles 134 coupled to the motors 132, fixed magnets 136 coupled to the motors 132, movable optical sensors 112, and the print head 104.

Thus, in various approaches the presently disclosed printing devices may include any of the following components, configurations, features, etc. in any suitable combination, permutation, synthesis, or exclusive set thereof.

As noted, an untethered, arbitrary-surface printing device, preferably includes at least: a housing 102; locomotive means 120 coupled to the housing and configured to move the device along the arbitrary surface 190; a carriage 114 disposed within the housing and coupled to a print head 104 configured to create markings on the arbitrary surface 190; a plurality of sensors 112, each sensor being configured to provide one or more of positional data, image data, and movement data; and at least one controller 124 configured to cause the device to: monitor one or more of a position and an orientation of at least one of the device, the print head, and one or more of the sensors; modify one or more of a position and an orientation of the print head using the carriage; modify one or more of a position and an orientation of the device with respect to the arbitrary surface using the locomotive means; modify one or more of a position and an orientation of one or more of the sensors; and create the markings on the arbitrary surface using the print head.

The print head 104 may also include either an aperture 118 or a stylus holder 108. The aperture 118 or a stylus holder 108 is configured to create the markings by either dispensing a printing material onto the arbitrary surface or engaging the arbitrary surface with a stylus positioned in the stylus holder 108.

The print head assembly 116 may additionally and/or alternatively include a carriage 114, e.g. a servo motor assembly configured to articulate a the print head 114 so as to position the aperture 118 or the stylus holder 108 within a 1-millimeter threshold vertical distance of the arbitrary surface 190; and one or more print head sensors 122 selected from the plurality of sensors 112, at least one of the print head sensors being an optical sensor.

In embodiments where the print head assembly 116 includes an aperture 118, it is additionally advantageous for the print head assembly 116 to include a reservoir 106 coupled to the aperture 118 and configured to provide the printing material to the aperture 118.

In embodiments where the print, head assembly 116 includes a stylus holder 108, it is additionally advantageous for the stylus holder to be configured to rotate the stylus 110 positioned within the holder around a longitudinal axis of the stylus.

The stylus 110 is preferably one or more of a writing implement and a carving implement, where writing, implements include pens (which should be understood as inclusive of all varieties of pen, e.g. ballpoint, felt, quill-and-ink, marker, etc.), pencils (which should be understood as inclusive of all varieties of pencil, e.g. pastel, mechanical, pure graphene stick, charcoal, chalk, etc. grease pen, etc.), brushes, stamps, and pins, while carving implements include: lasers, knives, chisels, drill bits, heating elements, and electrodes. Of course, any other suitable writing implement or carving implement appreciated by one having ordinary skill in the art upon reading the present descriptions should also be considered within the scope of these inventive concepts.

Turning now to the controller, in one approach the controller may further comprise a carriage controller (not shown) coupled to the printer carriage and configured to cause the printer carriage to modify one or more of the position and the orientation of the print head. In more preferred approaches, the controller comprises: at least one control board; and logic configured to cause the device to: monitor one or more of the position and the orientation of at least one of the device, the print head, and one or more of the sensors; modify one or more of the position and the orientation of the print head using the carriage; modify one or more of the position and the orientation of the device with respect to the arbitrary surface using the locomotive means; modify one or more of the position and the orientation of one or more of the sensors; and create the markings on the arbitrary surface using the print head.

The control board may be selected from a RASPBERRY PI®, INTEL GALILEO®, INTEL EDISON®, ARDUINO® control board, or a custom controller board, in various approaches.

With respect to the plurality of sensors 112, in preferred approaches the sensors include both internal sensors and external sensors. The internal sensors are disposed within the housing and comprise at least one of: cameras; accelerometers; gyroscopes; and/or magnetometers. The external sensors are disposed on an exterior of the housing and comprise at least one of: lasers; ultrasonic sensors; radio-frequency (RF) sensors; and infrared (IR) sensors. Of course, as would be understood by a skilled artisan reading the instant descriptions, any type of sensor discussed herein may be utilized as either an "external sensor" or an "internal sensor," without limitation.

FIG. 27 is a flowchart of a method 2700, according to one embodiment. The method 2700 may be performed in any suitable environment, including those shown in FIGS. 1-26. While the method 2700 is shown comprising several illustrative operations, it should be understood that these operations may be interchanged, modified, and/or supplemented with any other operation(s) disclosed herein, in any combination, permutation, synthesis, or exclusive set thereof.

In one approach, method 2700 includes operation 2702, where one or more multi-pass printing operations are performed on an arbitrary surface using an untethered printing device in order to create markings on the arbitrary surface.

As used herein, "creating markings" should be understood to include any suitable means of marking, etching, marring, engraving, cutting, heating, welding, or otherwise contacting a printing mechanism such as an aperture or stylus with the arbitrary printing surface. For example, creating markings may include depositing ink onto paper, carving a groove in a lithography medium, etching, a metal surface with a laser or acid, etc. as would be understood by one having ordinary skill in the art upon reading the instant disclosures.

Moreover, multi-pass printing is to be understood as a technique of creating markings on a printing surface by moving a print head across a print surface so that the print head passes directly adjacent to, or partially overlapping, markings created in an immediately previous print operation.

Returning to FIG. 27, and in preferred embodiments multi-pass printing performed in operation 2702 comprises operations 2704 and 2706. Notably, the markings are high-precision and therefore characterized by a resolution of at least 300 dots per inch (DPI).

As noted above, multi-pass printing involves operation 2704, where the untethered printing device is moved along the arbitrary printing surface, e.g. using locomotive means.

In operation 2706, markings are created on the arbitrary surface by either engaging the arbitrary surface with a stylus, or depositing a printing material on the arbitrary surface. The foregoing process may be repeated any number of times printing may include an number of "passes") to generate a high-precision printed image on the arbitrary surface. As the printing device moves around the arbitrary surface, the print head may be moved in any direction (e.g. via translation and/or rotation within the x, y and/or z planes/axes) in relation to the arbitrary surface, and/or the printing device itself in any suitable manner as disclosed herein.

In additional and/or alternative approaches, method 2700 may include any one or more of the following advantageous features and/or operations.

In one embodiment, for example, the one or more multi-pass printing operation(s) further comprise(s) moving a print head of the untethered printing device within a housing of the untethered printing device. This is to be distinguished from moving the printing device itself, and consequentially moving the print head as a result. Rather, this additional and independent movement enables the print head to move within the housing in a different direction than a direction along which the untethered printing device moves along the arbitrary surface. This allows the printing device to "backtrack" and/or "edit" an area previously printed upon, or to repeat printing operations on a same region even while the printing device continues to move around the print area.

As noted above, it is particularly advantageous to create the markings on the arbitrary surface by positioning, the print head within a 1-millimeter threshold vertical distance of the arbitrary surface.

Preferably, the printing is performed according to a predetermined pattern, which may be provided in the form of computer readable instructions interpretable by the printing device. In such approaches, method 2700 may further include receiving a predetermined print pattern, e.g. via a wireless communication means as known in the art. Thereafter, the method may include moving the untethered printing device along the arbitrary surface and creating the markings on the arbitrary surface, each based on the predetermined print pattern.

In more approaches, method 2700 may additionally and/or alternatively include cooperatively creating the markings based on the predetermined print pattern. This may be accomplished using a plurality of the untethered printing devices, and each of the plurality of untethered printing, devices is preferably configured to simultaneously perform one or more multi-pass printing, operations corresponding to a unique portion of the predetermined print pattern. For example, a series of devices may be physically and/or communicatively coupled, and may be moved around the print area in a manner suitable to "divide and conquer" the overall print process. Most preferably, the "divide and conquer" approach does not simply divide the printing operations among the plurality of print devices, but also coordinates the position of each printing device utilized in the process so as to avoid collisions between the various printing devices and maximize the efficiency of the overall print procedure.

In still more embodiments, the presently disclosed techniques may include suspending operation of the device during at least one of the multi-pass printing operation(s). Advantageously, the presently disclosed inventive devices are configured to autonomously resume operation after suspending printing, and even after being physically removed from the print area and returned to a different portion thereof. Preferably, the plurality of sensors 112 discussed above may be employed to this effect, and most preferably the plurality of sensors so employed include at least image sensors configured to capture image data as discussed herein. In this manner, the printing device is capable of returning to a last-known or last-printed position without relying on any data other than image data depicting the previously created markings. Of course, other positional and/or movement sensors may be employed to this effect without departing from the scope of the instant disclosures.

As such, exemplary print, suspension and resumption may include removing the device from the arbitrary surface; and replacing the device on the arbitrary surface in at least one of a different position (e.g. a different x, y coordinate) than a position from which the device was removed from the arbitrary surface; and a different orientation (e.g. a different angle of inclination, rotation, etc.) than an orientation from which the device was removed from the arbitrary surface.

To resume operation, the method may also include navigating the device to the position from which the device was removed from the arbitrary surface and the orientation from which the device was removed from the arbitrary surface; and resuming the suspended operation of the device.

In the image-based scenario discussed above, the navigating further comprises: detecting a last-printed position using one or more optical sensors; and positioning and orienting the device based on the detected last-printed position.

It will be clear that the various features of the foregoing methodologies may be combined in any way, creating a plurality of combinations, permutations, syntheses, etc. from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed:

1. An untethered, arbitrary-surface printing device, the device comprising:

a housing;

locomotive means coupled to the housing, and configured to move the device along the arbitrary surface;

a carriage disposed within the housing and coupled to a print head configured to create markings on the arbitrary surface;

a plurality of sensors, each sensor being configured to provide one or more of positional data, image data, and movement data; and at least one controller configured to cause the device to:

monitor one or more of a position and an orientation of at least one of the device, the print head, and one or more of the sensors;

modify one or more of a position and an orientation of the print head using the carriage;

modify one or more of a position and an orientation of the device with respect to the arbitrary surface using the locomotive means;

modify one or more of a position and an orientation of one or more of the sensors; and create the markings on the arbitrary surface using the print head.

2. The device as recited in claim 1, wherein the print head is disposed in a print head assembly further comprising:

either an aperture or a stylus holder, the aperture or stylus holder being configured to create the markings by either:

dispensing a printing material onto the arbitrary surface; or engaging the arbitrary surface with a stylus positioned in the stylus holder a servo motor assembly configured to articulate a the print head so as to position the aperture or the stylus holder within a 1-millimeter threshold vertical distance of the arbitrary surface; and one or more print head sensors selected from the plurality of sensors, at least one of the print head sensors being an optical sensor.

3. The device as recited in claim 2, wherein the print head assembly further comprises:

the aperture; and a reservoir coupled to the aperture and configured to provide the printing material to the aperture.

4. The device as recited in claim 2, wherein the print head assembly further comprises the stylus holder, and wherein the stylus holder is further configured to rotate a stylus positioned within the holder around a longitudinal axis of the stylus.

5. The device as recited in claim 4, further comprising the stylus, wherein the stylus is one or more of a writing implement and a carving implement.

6. The device as recited in claim 5, wherein the writing implements are selected from a group consisting of: pens, pencils, brushes, stamps, and pins.

7. The device as recited in claim 5, wherein the carving implements are selected from a group consisting of: lasers, knives, chisels, drill bits, heating elements, and electrodes.

8. The device as recited in claim 1, wherein the at least one controller further comprises a carriage controller coupled to the printer carriage and configured to cause the printer carriage to modify one or more of the position and the orientation of the print head.

9. The device as recited in claim 1, wherein the controller comprises:

at least one ARDUINO® control board; and logic configured to cause the device to:

monitor one or more of the position and the orientation of at least one of the device, the print head, and one or more of the sensors;

modify one or more of the position and the orientation of the print head using the carriage;

modify one or more of the position and the orientation of the device with respect to the arbitrary surface using the locomotive means;

modify one or more of the position and the orientation of one or more of the sensors; and create the markings on the arbitrary surface using the print head.

10. The device as recited in claim 1, wherein the one or more sensors comprise internal sensors and external sensors.

11. The device as recited in claim 10, wherein the internal sensors are disposed within the housing and comprise at least one of:

one or more cameras;

one or more accelerometers;

one or more gyroscopes;

one or more magnetometers; and one or more laser interferometers.

12. The device as recited in claim 10, wherein the external sensors are disposed on an exterior of the housing and comprise at least one of:

one or more lasers;

one or more ultrasonic sensors;

one or more radio-frequency (RF) sensors;

one or more infrared sensors; and one or more laser interferometers.

* * * * *